June 12, 1951 P. W. NORDT, JR 2,556,293
FLEXIBLE COUPLING
Filed May 12, 1948 2 Sheets-Sheet 2
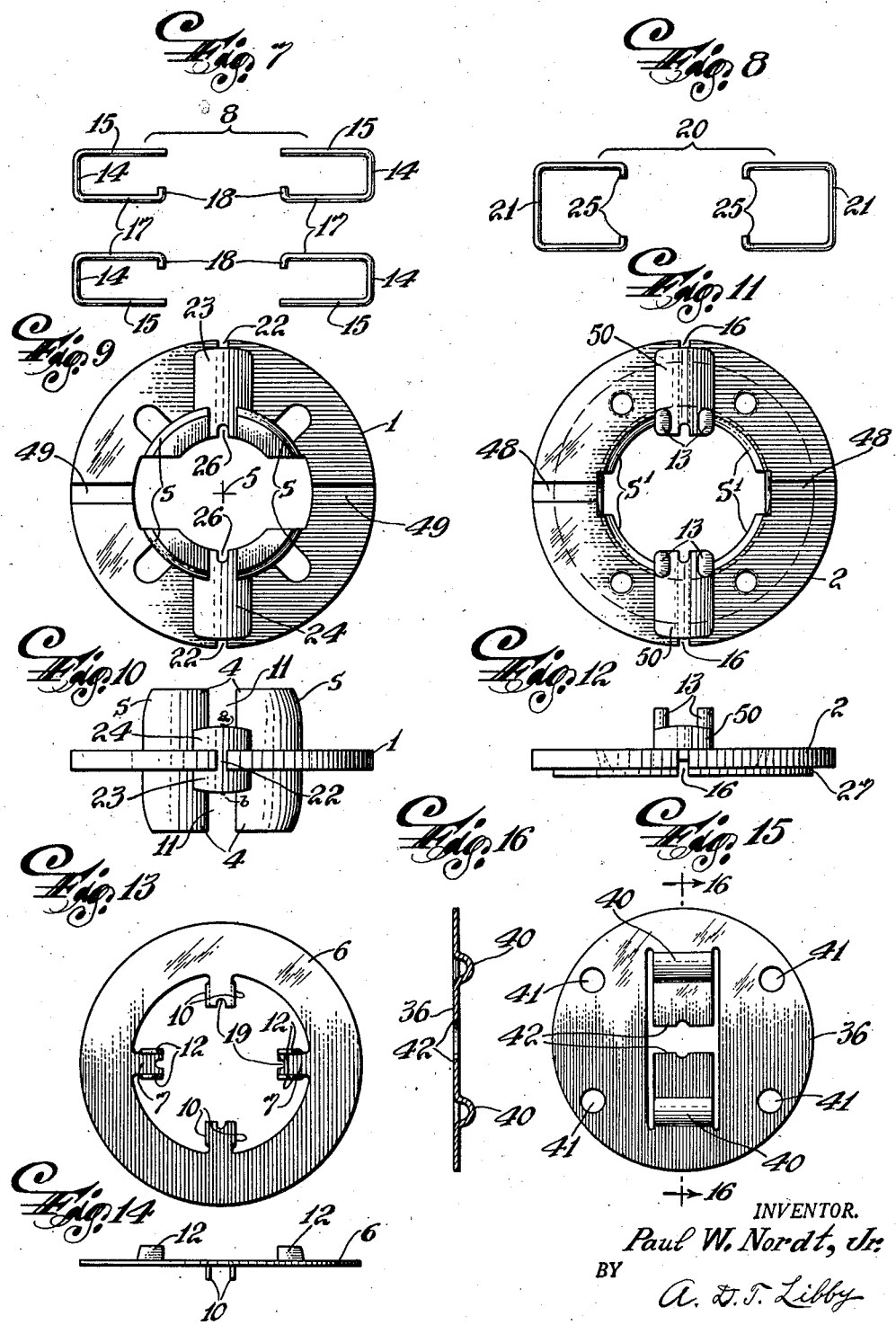
INVENTOR.
Paul W. Nordt, Jr.
BY
A. D. T. Libby
ATTORNEY Patented June 12, 1951

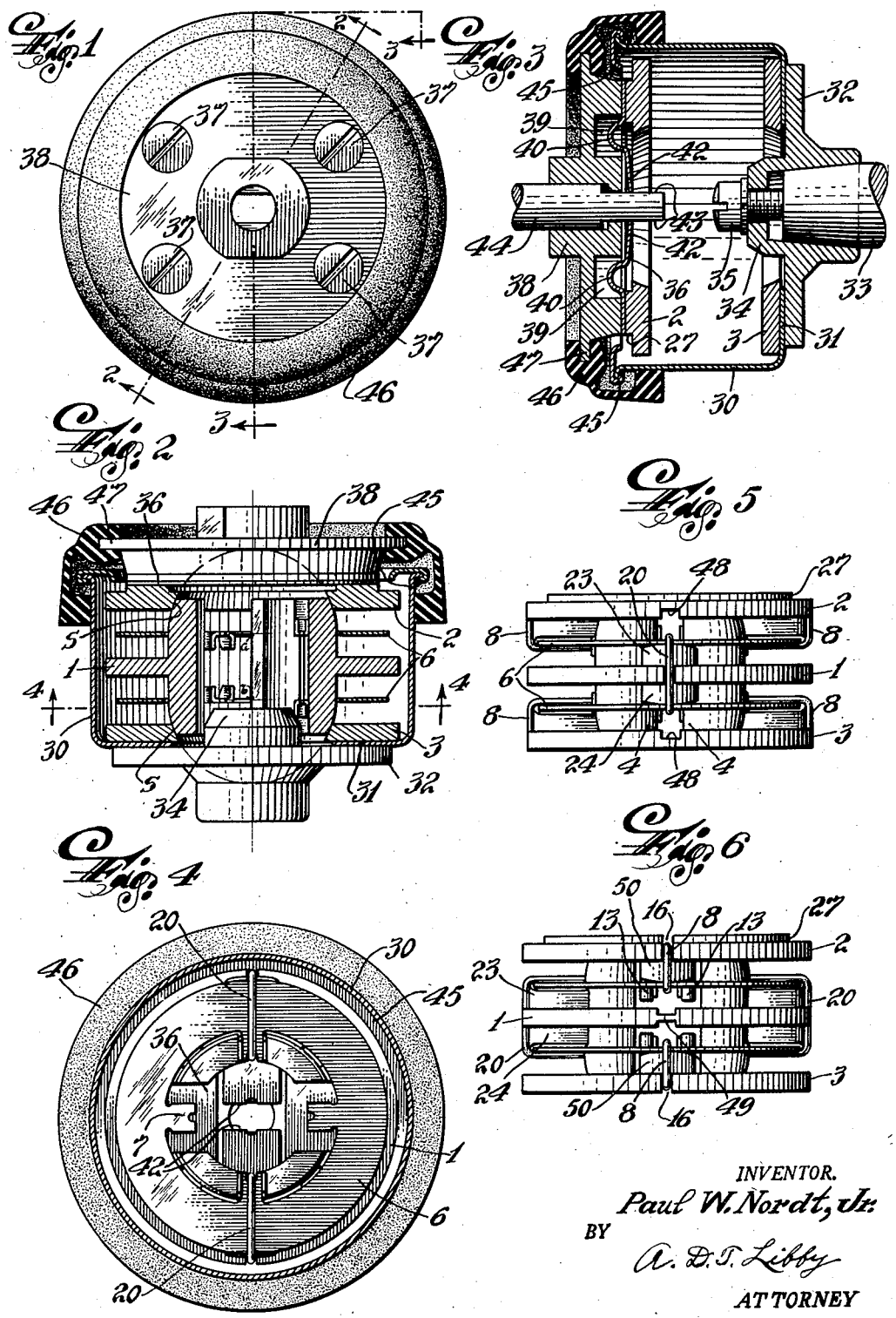

2,556,293

UNITED STATES PATENT OFFICE 2,556,293

FLEXIBLE COUPLING

Paul W. Nordt, Jr., Caldwell, N. J.

Application May 12, 1948, Serial No. 26,639

11 Claims. (Cl. 64—13)

This invention relates to a flexible coupling for connecting two rotatable shafts so as to eliminate the many objectionable features that are found in the couplings of the prior art. Many of the objectionable features are brought about when a coupling is used to connect two shafts wherein the axes of the shafts intersect at the center of the coupling or away from the center so the intersection is nearer one shaft end than the other or the axes are non-intersecting but parallel or non-intersecting within reasonable limits and not parallel.

Furthermore a coupling itself may give backlash due to clearances between interconnected parts or blacklash due to progressive wear of the inter-connected parts. Again the design of the coupling may be such as to introduce angular error or this error may be due to the torque applied to the coupling especially when material such as rubber is used as is frequently the case. Also, the designer may not take into account all the varieties of misalignment. It is therefore the principal object of my invention to provide a coupling that will overcome the troubles arising from the above conditions.

The coupling to be described, which was designed to be used with position indicators that require absolute synchronism between two interconnected shafts, has the following advantages:

1. It has a high degree of flexibility so that bearing loads due to misalignment are reduced to a minimum.

2. It employs flexing parts formed and arranged so as to take maximum advantage of the fatigue resisting properties of the material used.

3. It employs means for attachment to the driving and driven shafts, that gives a positive connection that cannot loosen with use and that can be readily installed or removed.

4. It is a coupling of extreme lightness, thereby giving a low rotative moment of inertia, yet one that is mechanically strong enough although employing parts made from light weight metals.

5. Its flexibility is unimpaired by the presence of axial compressive forces such as might exist because of the method of installation.

6. It is an enclosed structure which will prevent entry of foreign material into the working parts.

7. It has a smooth exterior free of any protrusions that are always found objectionable.

These and other advantages will be clear to one that has had experience with these devices from a study of the following detail specifications and the annexed drawings wherein the figures are approximately twice the size of a working model.

In the drawings,

Figure 1 is an end view of the complete assembled coupling looking at the end corresponding to the left hand end of Figure 3.

Figure 2 is a view on the line 2—2 of Figure 1 with some of the interior parts omitted.

Figure 3 is a view on the line 3—3 of Figure 1 with the internal parts removed to better show one method of connecting the coupling to shafts.

Figure 4 is a view on the line 4—4 of Figure 2.

Figure 5 is a plan view of the flexible portion of the coupling showing the location of the flexible members in relation to other parts.

Figure 6 is a view similar to Figure 5 but showing the flexible members in relation to different parts of the coupling.

Figure 7 shows four spring clips that hold the flexible members in position against certain curved surfaces on the end rings of the structure.

Figure 8 show the two spring clips used to hold the flexible members against the curved surfaces of the center ring of the structure.

Figure 9 is an axial or plan view of the center ring.

Figure 10 is a view of Figure 9 looking from bottom to top.

Figure 11 is an axial or plan view of one of the end rings.

Figure 12 is a radial view of Figure 11 or one looking from bottom to top.

Figure 13 is an axial or plan view of one of the flexible rings.

Figure 14 is a radial view of Figure 13 or one looking from bottom to top.

Figure 15 is an axial or plan view of the locking plate which receives one of the shafts of Figure 3.

Figure 16 is a side view of Figure 15 looking from left to right.

Referring now to the details wherein like numbers refer to corresponding parts in the various views, 1 is a center ring positioned between the end rings 2 and 3 and these rings with their interconnecting parts, which will be presently described, comprise the flexible and highly important part of the coupling.

The ring 1 has eight bosses or lugs 4 arranged in two groups, four disposed on each side of the ring 1 (Figure 10). Each group on opposite sides of the ring 1 has spherical surfaces $s$ with their centers at $a$ and $b$ which are longitudinally spaced on the main axis 5 of the coupling and located in the central planes of the spring rings 6 as shown in Figure 2. The inner bore of each end ring 2 and 3 is also similarly shaped at the surfaces $s'$ to receive the surfaces $s$ of the lugs 4.

By this construction these surfaces give an effect like ball and socket joints when the rings are caused to rock or oscillate for any of the reasons heretofore set forth and this rocking will be on the common axis 5 but at the centers $a$ and $b$.

The rings 1, and 2, and 3 are held in operative position by two similar spring rings 6 (see Figures 13 and 14). Each ring 6 has four fingers 7 projecting inwardly from its inner periphery for transmitting torque. One pair of diametrically opposite fingers has bent ears 10 extending in one direction to engage the side walls of slots 11 in the center ring 1 while the other pair of fingers has ears 12 bent in an opposite direction to the ears 10 so as to pass between and be engaged by the studs 13 on the end rings 2 and 3.

The spring rings 6 are held to the end rings 2 and 3 (see Fig. 6) by four snap springs 8 shown in Figure 7 from which it is seen that the yoke 14 and one arm 15 are seated in a slot 16 in the outer faces of the end rings 2 and 3 while the arm 17 passes inwardly over the outer end of boss 50 from which the studs 13 project at the inner end of boss 50 and over the ring 6 with the hooks 18 going into a continuation of the slot 16 on the inner end of the bosses 50 and lying in a recess 19 in the fingers 7.

The spring rings 6 are held in the center ring 1 by a pair of snap springs 20 shown in the Figures 8 and 5 from which it is seen that the yoke 21 lies in a notch 22 and passes across the top of bosses 23 and 24 located on opposite sides of the ring 1 and then inwardly through the slots 11 between the bosses 23 and 24 and over the fingers 10 while the hooks 25 enter the notches 26. It is thus seen that the bosses 50, 23 and 24 act as radial line contact seats for the spring rings 6 so they are in straight radial line contact with said bosses and thus being in position to achieve maximum resilience and flexibility. It will be noted that the end ring 2 has annular shoulder 27 otherwise it is exactly like the ring 3. The purpose of this shoulder will be later explained.

The flexible assembly just described is housed by a cup-shaped casing 30 having its bottom 31 fastened to end ring 3 by screws (not shown) which go through end plate 32 that has a tapered hole therein to receive the tapered end of a shaft 33. The end plate 32 has a hub 34 projecting inwardly to carry a screw 35 that is threaded into shaft 33.

Positioned on or against the annular shoulder 27 of end ring 2 is a locking disc 36 of tough resilient metal. It is held in place by the screws 37 going through holes 41 and which fastens the end plate 38 to the end ring 2. The end plate 38 has a pair of oppositely disposed recesses 39 to receive loops 40 formed at the base of two opposed fingers 42 that extend toward each other and are adapted to grip opposite flats 43 on the shaft 44 which is positioned in the end plates 38. As the shaft end 43 is pushed between the fingers 42 they will bend slightly and grip the shaft positively. When it is desired to withdraw the shaft from the coupling all that is necessary is to pull on the shaft. This will cause the loops 40 in the fingers 42 to flex in a manner so the shaft can be withdrawn. Thus a quick connection or disconnection can be made at this end of the coupling.

By having the annular shoulder 27 on the ring 2 sufficient clearance is given at this end for the movement of surfaces S on the center ring 1 as this end ring may be caused to tilt somewhat in its movement when the two connected shafts are misaligned. At the end of the ring 3 this kind of clearance is provided by the thickness of the bottom 31 of the cup 30, or by a recess in the end plate 32.

Crimped over the edge of the cup 30 is a rim member 45 which serves as a limiting retainer when the flexible assembly inside the cup 30 is extended axially.

A suitable gauntlet 46 of some soft flexible material such as rubber fits over the flange 47 of the end plate 38 and also over the union between the cup 30 and rim member 45, thereby completely closing this end to water, dirt and the like.

It may be noted in passing that the inner faces of the end rings 2 and 3 have grooves 48 therein located opposite the center of the bosses 24 and the ring 1 has grooves 49 therein opposite the snap springs 8 in end rings 2 and 3. This is to give clearance spaces for the arms of the snap springs 8 and 20 when the end rings are tilted as described above.

While I have shown two different methods of connecting the coupling to shafts other ways may be used without altering the heart of my invention which is in the flexible interior structure.

Having thus described my invention, what I claim is:

1. A flexible coupling including, an integral unit comprising a central ring and two end rings with a thin metallic spring ring located between each end ring and the central ring, the central ring having two pairs of bosses diametrically located and extending from opposite sides of the ring and having outer arcuate bearing surfaces, while each end ring has bearing surfaces to cooperate with the bearing surfaces on the adjacent sides of the central ring, the central and end rings having cooperative parts positioned to receive driving means and also for receiving means for holding them in operative position, each spring ring having driving parts for screwless engagement with said cooperative parts on the adjacent end rings and the central ring, said holding means comprising at least one pair of hook snap springs for holding the spring ring to the central ring and at least two pairs of snap rings to hold the spring ring to the end rings.

2. A flexible coupling as set forth in claim 1 further characterized in that the snap springs holding the end rings to their respective spring rings are located in the same plane through the unit, while the snap springs which hold the spring rings to the central ring are in a plane at right angles to the first mentioned plane.

3. A flexible coupling including, a unit having a centrally located ring and an end ring on each side thereof, the central ring having lugs axially extending from opposite sides thereof and these lugs having spherically curved surfaces thereon, the center of curvature being on the axis of the unit, said end rings having co-operative curved surfaces to act as seats for said lug surfaces, a spring ring between each end ring and the central ring and snap springs holding the spring rings to the end rings and to the central ring, said unit having a housing including end plates fastened to the end rings and adapted to operatively receive the shaft ends.

4. A flexible coupling as set forth in claim 3 further defined in that the central ring has adjoining bosses spaced 180 degrees while the end rings have oppositely positioned bosses but arcuately spaced 90 degrees from those on the central ring, the bosses serving as seats for the spring rings, while the snap springs pass over the bosses and spring rings to hold them securely in place.

5. A flexible coupling as set forth in claim 3 further defined in that the central ring has adjoining bosses spaced 180 degrees while the end rings have oppositely positioned bosses but arcuately spaced 90 degrees from those on the central ring, the spring rings having inwardly positioned fingers having ears turned so one set of fingers and ears engage parts on the end rings, while the other set engages parts on the central ring to positively position the spring rings in the unit.

6. A flexible coupling as set forth in claim 3 further defined in that the central ring has adjoining bosses spaced 180 degrees while the end rings have oppositely positioned bosses but arcuately spaced 90 degrees from those on the central ring, the end rings having grooves in their rims and outer faces to receive at least the yoke and one arm of their snap springs and grooves on their inner faces opposite the center of said bosses on the central ring which has adjacent grooves on both faces opposite the snap rings on the end rings, said grooves providing spaces for the arms of the snap springs that go over these bosses and spring rings if and when the end rings are caused to oscillate unduly.

7. A flexible coupling as set forth in claim 3 further defined in that the central ring has adjoining bosses spaced 180 degrees while the end rings have oppositely positioned bosses but arcuately spaced 90 degrees from those on the central ring, the bosses having slightly curved ends to form rocking seats for the spring rings while the snap rings have their yokes positioned in grooves in the rims of the central and end rings and then pass over the bosses and spring rings to hold these rings on the curved seats, the spring rings having internally positioned fingers engaging parts on the central and end rings to positively position the spring rings in the unit.

8. A flexible coupling including, a unit having a centrally located ring and an end ring on each side thereof, said end rings being operatively connected to the central ring by two spring rings disposed one each between the central ring and an end ring, snap springs engaging and holding all of said rings in operative position, said unit having a housing including end plates fastened to the end rings and adapted to operatively receive shaft ends, one end plate having oppositely disposed recesses therein, the end ring adjacent said end plate having an annular shoulder, a lock ring positioned against said shoulder and held there by said end plate, the lock ring having oppositely disposed loops located within said end plate recesses, said lock ring having oppositely positioned fingers extending toward each other and adapted to grip opposite flat surfaces on a shaft end.

9. A flexible coupling including, a unit having a centrally located ring and an end ring on each side thereof, said end rings being operatively connected to the central ring by two spring rings disposed one each between the central ring and an end ring, snap springs engaging and holding all of said rings in operative position, said unit having a housing including end plates fastened to the end rings and adapted to operatively receive shaft ends, one of which has oppositely positioned flat surfaces and means making a connection thereto, said means comprising a lock ring held between this end ring and end plate and having oppositely positioned resilient fingers extending toward each other and adapted to grip said shaft end flat surfaces.

10. For use in a flexible coupling, a unit have a centrally located ring and an end ring on each side thereof, the central ring having lugs axially extending from opposite sides thereof and their lugs having spherically curved outer surfaces thereon, the center of curvature being on the axis of the unit, said end rings having co-operatively curved surfaces acting as seats for said lug surfaces, a spring ring between each end ring and the central ring and snap springs holding the spring rings to the end rings and to the central ring.

11. A flexible coupling including, a unit having a centrally located ring and an end ring on each side thereof, said center ring having a plurality of oppositely extending arcuately spaced bosses each having outer spherical surfaces while each end ring has similarly shaped surfaces to operatively engaged said spherical surfaces on the bosses of the center ring, said end rings also having oppositely disposed interior bosses with spaced studs projecting inwardly from the inner ends of said bosses, two spring rings disposed, one between the central ring and each of the end rings, each spring ring having a plurality of arcuately located inwardly projecting driving fingers with means thereon to engage said studs on the end rings and the bosses on the central ring, and means for holding all of said rings in operative position, said means comprising a pair of U shaped snap springs for holding the spring rings to the central ring and two pair of snap springs for holding the spring rings to the end rings.

PAUL W. NORDT, JR.

REFERENCES CITED

The following references are of record in the file of this patent:

UNITED STATES PATENTS

| Number | Name | Date |
|---|---|---|
| 1,816,891 | Boyden | Aug. 4, 1931 |
| 2,182,711 | Thomas | Dec. 5, 1939 |
| 2,290,776 | Stillwagon, Jr. | July 21, 1942 |

FOREIGN PATENTS

| Number | Country | Date |
|---|---|---|
| 729,883 | France | 1932 |